United States Patent

Shen

Patent Number: 5,113,673
Date of Patent: May 19, 1992

[54] LOCK FOR A STEERING WHEEL OF AN AUTOMOBILE

[76] Inventor: Alice Shen, 68-1, Hsien Jen Road. Ta Chia Chen, Tai Chung Hsien, Taiwan

[21] Appl. No.: 713,992

[22] Filed: Jun. 12, 1991

[51] Int. Cl.⁵ .............................................. B60R 25/02
[52] U.S. Cl. .................................... 70/209; 70/226
[58] Field of Search ............... 70/225, 226, 237, 238, 70/239, 209, 211, 212

[56] References Cited

U.S. PATENT DOCUMENTS

| | | | |
|---|---|---|---|
| 4,730,470 | 3/1988 | Zane et al. | 70/211 |
| 4,887,443 | 12/1989 | Wang | 70/209 |
| 4,935,047 | 6/1990 | Wu | 70/209 |
| 4,970,884 | 11/1990 | Solow | 70/226 |
| 5,005,388 | 4/1991 | Lo | 70/209 |
| 5,042,278 | 8/1991 | Wang | 70/226 |
| 5,052,201 | 10/1991 | Liou | 70/226 |

*Primary Examiner*—Renee S. Luebke
*Assistant Examiner*—Darnell M. Boucher
*Attorney, Agent, or Firm*—Morton J. Rosenberg; David I. Klein

[57] ABSTRACT

This invention relates to lock for a steering wheel of an automobile and in particular to one which includes a movable latch having a plurality of annular grooves and a hook at one end, a body portion provided with a longitudinal hole for passage of the movable latch, a hook on the bottom and a seat on the top, a fixed latch extending from one end of the body portion, and a core including an axle sleeve received in the hole of the seat and kept in position by a pin extending through the seat and the axle sleeve, whereby the core is difficult to be destructed and the lock may be reduced when not in use.

2 Claims, 5 Drawing Sheets

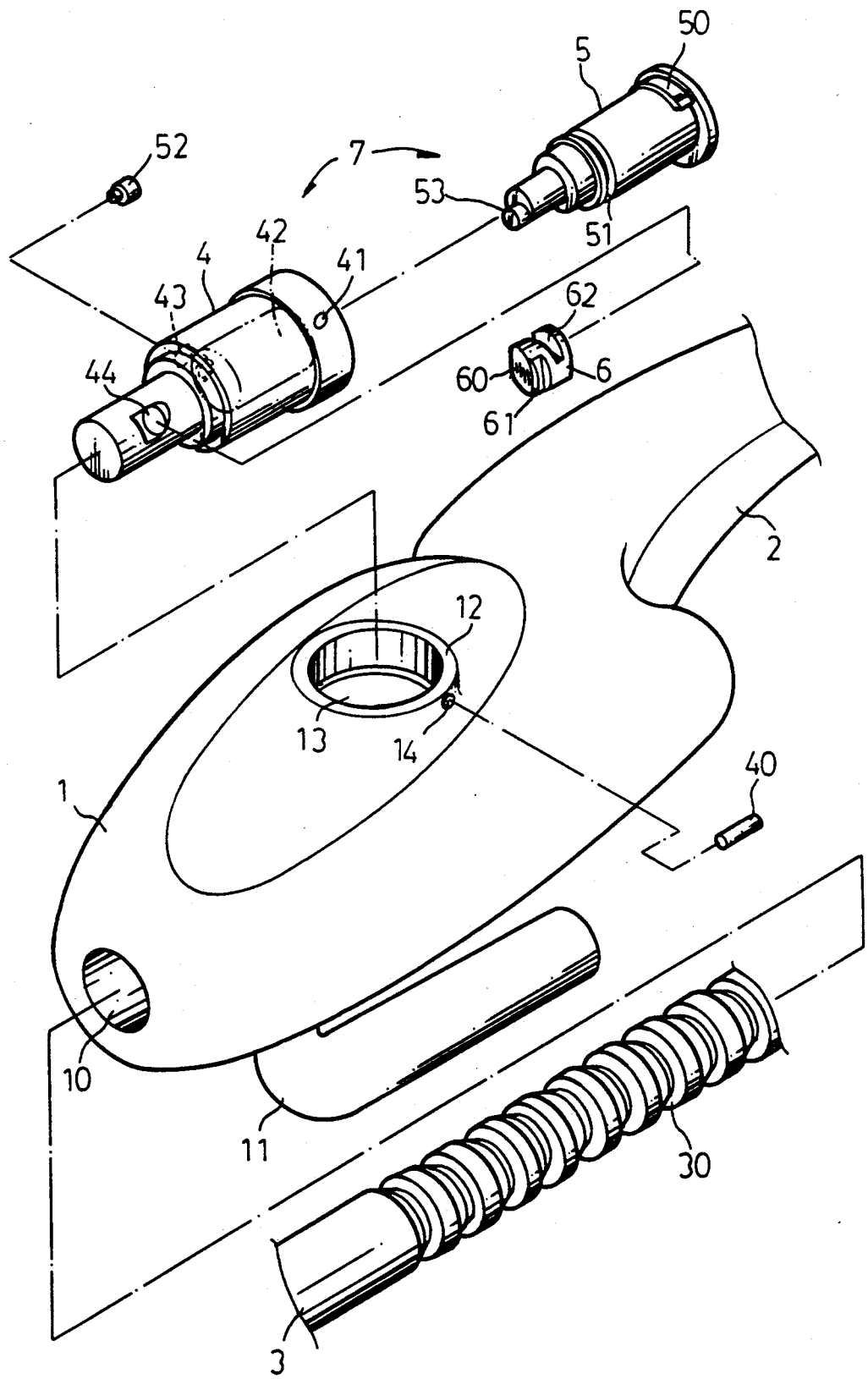
F I G. 1

A—A

B—B

LOCK FOR A STEERING WHEEL OF AN AUTOMOBILE

BACKGROUND OF THE INVENTION

Referring to FIG. 8, there is shown an exploded view of a prior art lock for the steering wheel of an automobile. As illustrated, the lock is composed of a body portion 9, a fixed latch 90 and a movable latch 91. The body portion 9 is provided with a seat 93 for receiving a core 98. The fixed latch 90 is fixedly connected with the rear end of the body portion 9 and has a hook 94 at the intermediate portion and a handle 95 at the rear end. The movable latch 91 may be inserted into a hole 92 of the body portion 9 at one end and has a hook 97 at other. When the core 98 is turned by a correct key, an actuating element 99 will engage the groove 96 of the movable latch 91 so that the hooks 97 and 94 may bear against the steering wheel thus limiting the rotating angle of the steering wheel.

However, the resilint means urging against the actuating element 99 will become fatigue after a certain period of time so that the movable latch 91 may be pulled out when applied by a strong force. Further, the lock is rather long in length hence making it difficult to be stowed when not in use.

Therefore, it is an object of the present invention to provide a lock for the steering wheel of an automobile which may obviate and mitigate the above-mentioned drawbacks.

SUMMARY OF THE INVENTION

This invention relates to an improved lock for the steering wheel of an automobile.

It is the primary object of the present invention to provide a lock for the steering wheel of an automobile of which the core is difficult to be destructed.

It is another object of the present invention to provide a lock for the steering wheel of an automobile which may be reduced in size when not in use.

It is still another object of the present invention to provide a lock for the steering wheel of an automobile which is simple in construction.

It is still another object of the present invention to provide a lock for the steering wheel of an automobile which is easy to operate.

It is a further object of the present invention to provide a lock for the steering wheel of an automobile which is economic to produce.

Other objects and merits and a fuller understanding of the present invention will be obtained by those having ordinary skill in the art when the following detailed description is read in conjunction with the accompanying drawings.

BRIEF DESCRIPTION OF THE DRAWINGS

FIG. 1 is an exploded view of the present invention.

DETAILED DESCRIPTION OF THE PREFERRED EMBODIMENT

Figure 2:
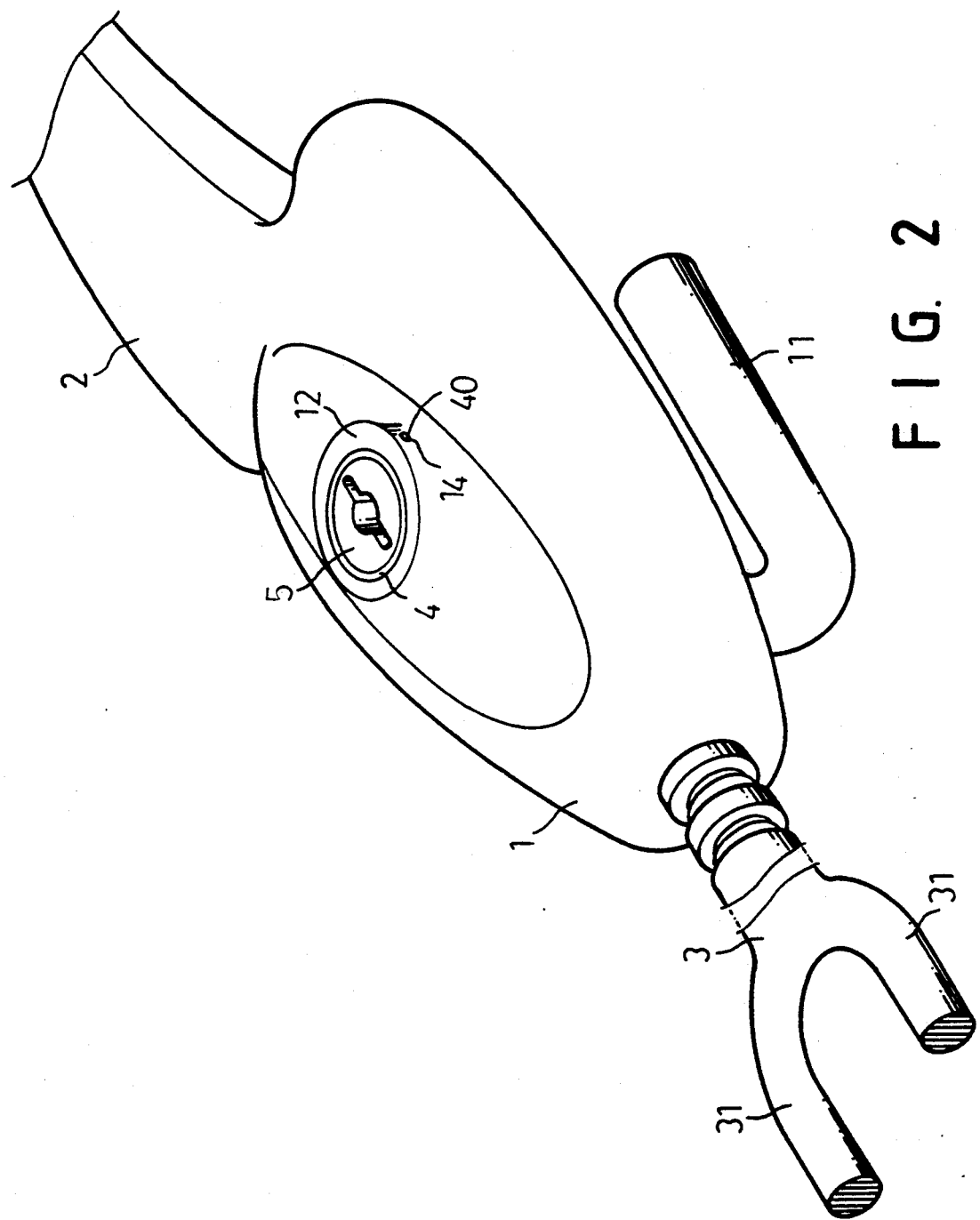
FIG. 2 is a perspective view of the present invention.
Figure 3:
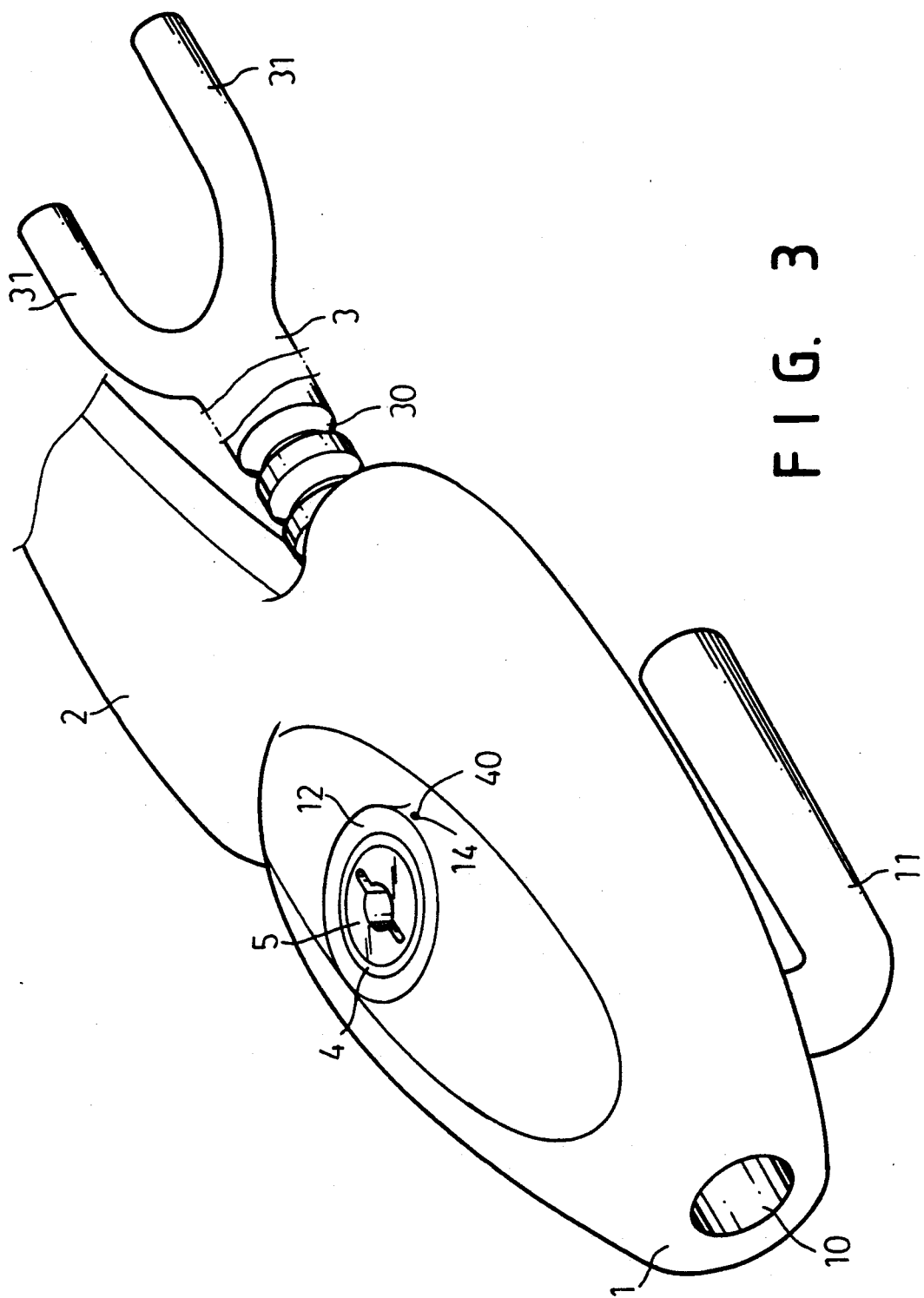
FIG. 3 is a working view of the present invention.

With reference to the drawings and in particular to FIG. 1 thereof, the lock for the steering wheel of an automobile according to the present invention mainly comprises a body portion 1, a fixed latch 2, a movable latch 3 and a core 7. The body portion 1 is provided with a hole 10 for the passage of the movable latch 3 which has a plurality of annular grooves 30. The body portion 1 is provided with a hook 11 on the bottom and a seat 12 on the top. The interior of the seat 12 has a hole 13 in communication with the hole 10 of the body portion 1. The fixed latch 2 extends from the rear end of the body portion 1 while the movable latch 3 has a hook 31 at the front end.

The core 7 includes an axle sleeve 4 which is received in the hole 13 and kept in position by a pin 40 extending through a hole 14 of the seat 12 and a hole 41 of the axle sleeve 4. The axle sleeve 4 is formed in its interior with a chamber 42 which is communicated with a hole 43 and a slot 44 of the axle sleeve 4. The chamber 42 of the axle sleeve 4 is designed to receive an axle block 5 which has a stop portion 50 at the upper end, an annular groove 51 at the intermediate portion and an eccentric pin 53 at the other end. A pin 52 extends through the hole 43 of the axle sleeve 4 to engage with the annular groove 51. The slot 44 of the axle sleeve 4 is used to receive a locking member 6 which has a curved surface 60 at the bottom end and two shoulders 61 at two sides, and a slot 62 near the upper end.

Further, the bottom of the hole 10 of the body portion 1 is provided with a positioning member 15 and a resilent member 16 which are kept in place by a cover 17 and designed to fix the position of the movable latch 3.

In assembly (see FIGS. 1 and 2), the locking member 6 first is arranged into the slot 44 of the axle sleeve 4 and then the axle block 5 is inserted into the chamber 42 of the axle sleeve 4 with the eccentric pin 53 engaged with the slot 62 of the locking member 6. Thereafter, the pin 52 is engaged with the annular groove 51 of the axle block 5 through the hole 43 of axle sleeve 4 so that the axle block 5 can only rotate within the axle sleeve 4 and cannot be disengaged from the axle sleeve 4 thereby forming a whole core 7. Then the whole core 7 is mounted into the hole 13 of the lock body 1 and kept in position by the pin 40 extending through the hole 14 of the seat 12 and the hole 41 of the axle sleeve 4. Finally, the core 7 may be released by a correct key so that the movable latch 3 may engage with the hole 10 of the body portion 1.

Figure 4:
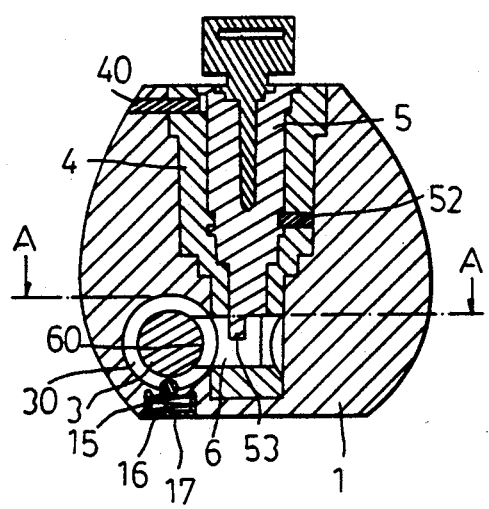
FIG. 4 is a sectional view showing the locking state of the present invention.
Figure 5:
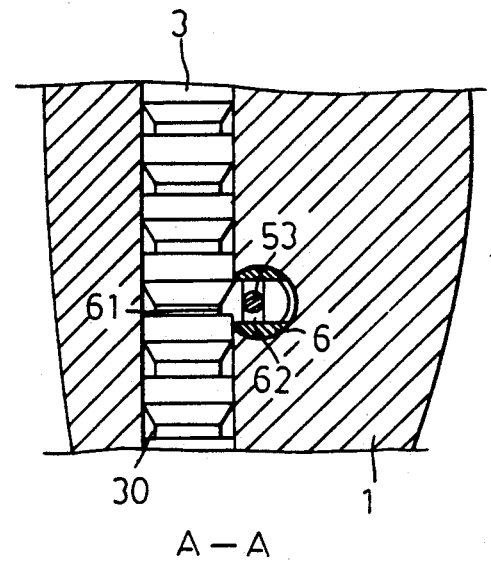
FIG. 5 is a sectional view taken along line A—A of FIG. 4.
Figure 6:
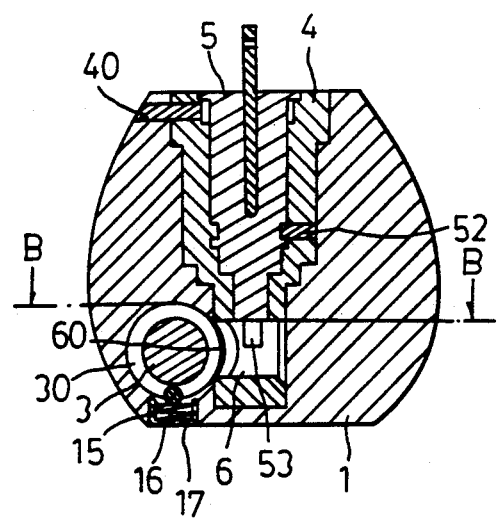
FIG. 6 is a sectional view showing the unlocking state of the present invention.
Figure 7:
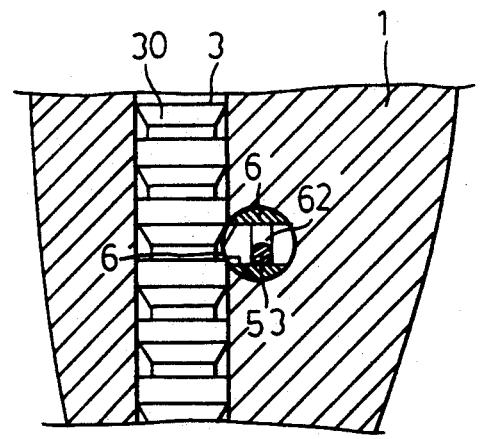
FIG. 7 is a sectional view taken along line B—B of FIG. 6.
Figure 8:
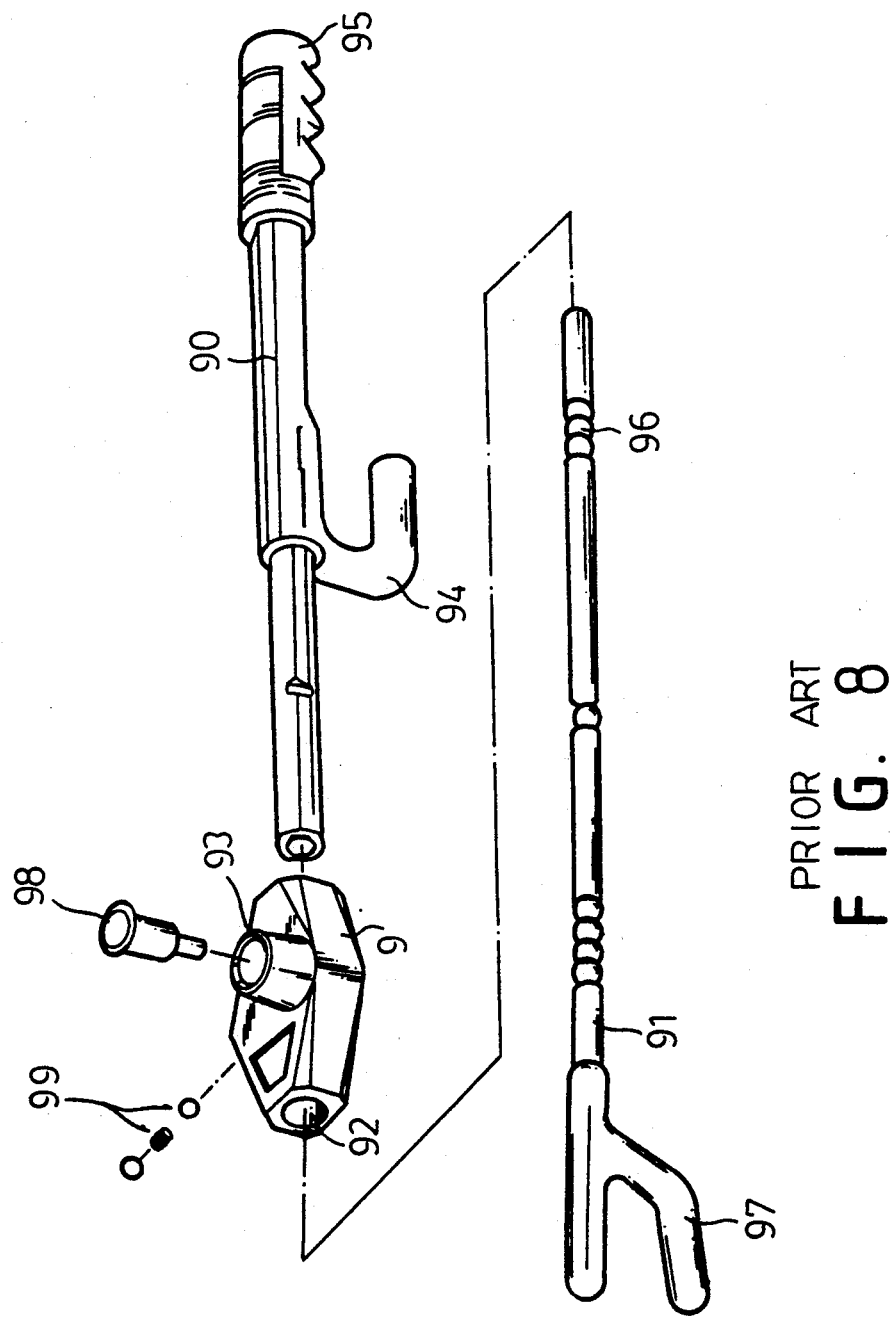
FIG. 8 is an exploded view of the prior art lock for the steering wheel of a lock.

As the correct key turns the axle block 5 to rotate about the pin 52 (see FIGS. 2 and 4), the eccentric pin 53 of the axle block 52 will move in the slot 62 of the locking member 6 thus moving the locking member 6 outwards or inwards. When the locking member 6 is moved outwards, the curved surface 60 of the locking member 6 will engage with the curved surface of the movable latch 3. In the meantime, the shoulders 61 of the locking member 6 will engage with the annular grooves 30 of the movable latch 3 thus achieving the locking action. Hence, the hook 11 of the body portion 1 and the hook 31 of the movable latch 3 will be used to lock the steering wheel of a car thereby limiting the rotating angle of the steering wheel of a car. As the locking member 6 is moved inwards, the curved surface 60 of the locking member 6 and the shoulders 61 will no longer limit the movement of the movable latch 3 thus achieving the unlocking action. Hence, the movable latch 3 may be moved and the hook 31 thereof may be separated from the steering wheel.

When not in use, simply engage the movable latch 3 with the other end of the body portion 1 thus reducing the length of the lock and facilitating the stowage thereof.

From the foregoing it will be observed the numerous variations and modifications may be effected without departing from the true spirit and scope of the novel concept of the present invention. It will be understood that no limitations with respect to the specific article illustrated herein is intended or should be inferred. It is, of course, intended to cover by the appended claims all such modifications as fall within the scope of the claims.

I claim:

1. A lock for a steering wheel of an automobile comprising:
   a movable latch having a plurality of annular grooves and a hook at one end;
   a body portion provided with a longitudinal hole for passage of said movable latch, a hook formed on a bottom surface of said body portion and a seat formed on a top surface thereof, said seat being formed with a hole in open communication with the longitudinal hole, said longitudinal hole being provided at a bottom portion thereof with a positioning member and a resilient member which are kept in place by a cover for fixedly positioning said movable latch;
   a fixed latch extending from one end of said body portion; and
   a core including an axle sleeve received in the hole of said seat and kept in position by a pin extending through said seat and said axle sleeve, said axle sleeve being formed with a chamber which is in open communication with a hole formed at the bottom of said axle sleeve and a slot of said axle sleeve for receiving an axle block, said axle block having a stop portion at the upper end, an annular groove at the intermediate portion and an eccentric pin at the other end, the slot of said axle sleeve being used to receive a locking member which has a curved surface formed at a bottom end thereof and two shoulders at two sides and a slot formed near an upper end thereof.

2. The lock for a steering wheel of an automobile as recited in claim 1, wherein the longitudinal hole of said body portion is a through hole; said movable latch being insertable into said body portion from an end of said longitudinal hole.

* * * * *